US012749598B2

(12) United States Patent
Yamaguchi

(10) Patent No.: US 12,749,598 B2
(45) Date of Patent: Sep. 29, 2026

(54) SUPERCONDUCTING WIRE AND SUPERCONDUCTING WIRE CONNECTION STRUCTURE

(71) Applicant: SUMITOMO ELECTRIC INDUSTRIES, LTD., Osaka (JP)

(72) Inventor: Takashi Yamaguchi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 197 days.

(21) Appl. No.: 18/693,974

(22) PCT Filed: Jun. 22, 2022

(86) PCT No.: PCT/JP2022/024880

§ 371 (c)(1),
(2) Date: Mar. 21, 2024

(87) PCT Pub. No.: WO2023/047727

PCT Pub. Date: Mar. 30, 2023

(65) Prior Publication Data

US 2024/0387074 A1 Nov. 21, 2024

(30) Foreign Application Priority Data

Sep. 27, 2021 (JP) ................................ 2021-156923

(51) Int. Cl.
*H01B 12/00* (2006.01)
*H01B 12/06* (2006.01)

(52) U.S. Cl.
CPC .................................. *H01B 12/06* (2013.01)

(58) Field of Classification Search
CPC .................................................... H01B 12/06
See application file for complete search history.

(56) References Cited

U.S. PATENT DOCUMENTS

2020/0028061 A1* 1/2020 Nakai .................... H10N 60/80

FOREIGN PATENT DOCUMENTS

| | | | |
|---|---|---|---|
| JP | 2012-204190 A | | 10/2012 |
| JP | 2012204190 | * | 10/2012 |
| JP | 2014-120383 A | | 6/2014 |
| JP | 2019175637 A | * | 10/2019 |
| WO | 2020/165939 A1 | | 8/2020 |

* cited by examiner

*Primary Examiner* — Pete T Lee
(74) *Attorney, Agent, or Firm* — Renner, Otto, Boisselle & Sklar, LLP

(57) ABSTRACT

A superconducting wire includes a substrate and a superconducting layer disposed on the substrate. The superconducting layer has a first surface facing the substrate and a second surface opposite to the first surface. The second surface has a portion having an arithmetic average roughness of 20 nm or more and a maximum height of 0.25 μm or more.

8 Claims, 4 Drawing Sheets

SUPERCONDUCTING WIRE AND SUPERCONDUCTING WIRE CONNECTION STRUCTURE

TECHNICAL FIELD

The present disclosure relates to a superconducting wire and a superconducting wire connection structure. The present application claims priority based on Japanese Patent Application No. 2021-156923 filed on Sep. 27, 2021. The entire contents of the Japanese patent application are incorporated herein by reference.

BACKGROUND ART

For example, Japanese Patent Laying-Open No. 2014-120383 (PTL 1) discloses a superconducting wire. The superconducting wire disclosed in PTL 1 includes a base material, an intermediate layer, an oxide superconducting layer, a protective layer, and a stabilization layer.

The intermediate layer is disposed on the base material. The oxide superconducting layer is disposed on the intermediate layer. The protective layer is disposed on the oxide superconducting layer. The stabilization layer is disposed on the protective layer. The oxide superconducting layer has a surface having an arithmetic average roughness of 20 nm or less and a maximum height of 60 nm or less.

CITATION LIST

Patent Literature

PTL 1: Japanese Patent Laying-Open No. 2014-120383

SUMMARY OF INVENTION

A superconducting wire of the present disclosure includes a substrate, and a superconducting layer disposed on the substrate. The superconducting layer has a first surface facing the substrate and a second surface opposite to the first surface. The second surface has a portion having an arithmetic average roughness of 20 nm or more and a maximum height of 0.25 μm or more.

DETAILED DESCRIPTION

Figure 1:
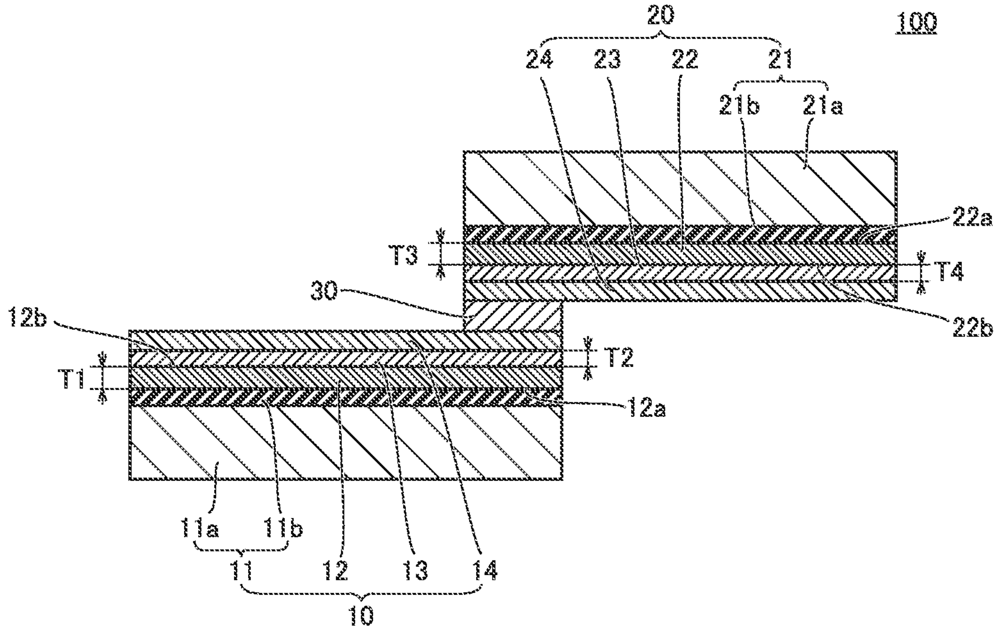
FIG. 1 is a cross-sectional view of a superconducting wire connection structure 100.

Problem to be Solved by the Present Disclosure

When manufacturing superconducting application devices, a plurality of superconducting wires may be connected to each other with a solder alloy or the like. When a plurality of superconducting wires disclosed in PTL 1 are connected to each other with solder or the like, the connection resistivity increases.

The present disclosure has been made in view of the problem of the conventional art as described above. More specifically, the present disclosure provides a superconducting wire that allows reduction in connection resistivity in a plurality of superconducting wires connected to each other.

Advantageous Effect of the Present Disclosure

According to the superconducting wire of the present disclosure, the connection resistivity in a plurality of superconducting wires connected to each other can be lowered.

Description of Embodiments of the Present Disclosure

First, embodiments of the present disclosure will be listed and described.

(1) A superconducting wire according to an embodiment includes a substrate, and a superconducting layer disposed on the substrate. The superconducting layer has a first surface facing the substrate and a second surface opposite to the first surface. The second surface has a portion having an arithmetic average roughness of 20 nm or more and a maximum height of 0.25 μm or more.

According to the superconducting wire in the above (1), the connection resistivity in the plurality of superconducting wires connected to each other can be lowered.

(2) In the superconducting wire in the above (1), the portion of the second surface may have an arithmetic average roughness of 60 nm or more and a maximum height of 0.25 μm or more.

(3) The superconducting wire in the above (1) or (2) may further include a protective layer disposed on the superconducting layer. A constituent material of the protective layer may contain copper.

According to the superconducting wire in the above (3), occurrence of a connection failure in the plurality of superconducting wires connected to each other can be suppressed.

(4) The superconducting wire in the above (1) or (2) may further include a protective layer disposed on the superconducting layer. A constituent material of the protective layer may contain silver.

(5) In the superconducting wire in the above (4), the protective layer may form an outermost layer of the superconducting wire. The protective layer may have a thickness of 1.0 μm or more.

According to the superconducting wire in the above (5), the plurality of superconducting wires can be easily connected with a solder alloy, and occurrence of a connection failure in the plurality of superconducting wires connected to each other can be suppressed.

(6) The superconducting wire in the above (3) or (4) may further include a stabilization layer disposed on the protective layer. A constituent material of the stabilization layer may be copper or a copper alloy.

According to the superconducting wire in the above (6), occurrence of a connection failure in the plurality of superconducting wires connected to each other can be suppressed.

(7) In the superconducting wire in the above (1) to (6), the superconducting layer may have a thickness of 4.5 μm or less.

According to the superconducting wire in the above (7), the superconducting wire can be reduced in thickness and the cost of manufacturing the superconducting wire can be reduced.

(8) A superconducting wire connection structure according to an embodiment includes a first superconducting wire, a second superconducting wire, and a connection layer. The first superconducting wire includes: a first substrate; a first superconducting layer disposed on the first substrate; a first protective layer disposed on the first superconducting layer; and a first stabilization layer disposed on the first protective layer. The second superconducting wire includes: a second substrate; a second superconducting layer disposed on the second substrate; a second protective layer disposed on the second superconducting layer; and a second stabilization layer disposed on the second protective layer. The first superconducting layer has a first surface facing the first substrate, and a second surface opposite to the first surface. The second superconducting layer has a third surface facing the second substrate, and a fourth surface opposite to the third surface. The first stabilization layer is connected to the second stabilization layer by the connection layer. The second surface has a portion having an arithmetic average roughness of 20 nm or more and a maximum height of 0.25 μm or more. The fourth surface has a portion having an arithmetic average roughness of 20 nm or more and a maximum height of 0.25 μm or more.

According to the superconducting wire connection structure in the above (8), the connection resistivity between the first superconducting wire and the second superconducting wire can be lowered.

Details of Embodiments of the Present Disclosure

Details of embodiments of the present disclosure will be described with reference to the accompanying drawings, in which the same or corresponding portions are denoted by the same reference characters, and the same description will not be repeated.

Configuration of Superconducting Wire Connection Structure According to Embodiment The following describes a configuration of a superconducting wire connection structure according to an embodiment. The superconducting wire connection structure according to the embodiment will be referred to as a superconducting wire connection structure 100.

FIG. 1 is a cross-sectional view of superconducting wire connection structure 100. As shown in FIG. 1, superconducting wire connection structure 100 includes a first superconducting wire 10, a second superconducting wire 20, and a connection layer 30. Although FIG. 1 shows one first superconducting wire 10 and one second superconducting wire 20, the respective numbers of first superconducting wires 10 and second superconducting wires 20 may be more than one.

First superconducting wire 10 includes a first substrate 11, a first superconducting layer 12, a first protective layer 13, and a first stabilization layer 14.

First substrate 11 includes a base material 11*a* and an intermediate layer 11*b*. Intermediate layer 11*b* is disposed on base material 11*a*. Base material 11*a* is, for example, a cladding material in which a copper (Cu) layer and a nickel (Ni) layer are stacked on a stainless steel tape. Intermediate layer 11*b* is, for example, a layer in which a layer of cerium oxide ($CeO_2$), a layer of yttria-stabilized zirconia (YSZ), and a layer of yttria ($Y_2O_3$) are stacked. Intermediate layer 11*b* is formed, for example, by magnetron sputtering.

First superconducting layer 12 is disposed on first substrate 11. More specifically, first superconducting layer 12 is disposed on intermediate layer 11*b*. The constituent material of first superconducting layer 12 is, for example, REBCO. REBCO is an oxide superconductor represented by $REBa_2Cu_3O_x$. In this case, RE represents a rare earth element. The rare earth element in the REBCO constituting first superconducting layer 12 is at least one or more elements selected from the group consisting of yttrium, lanthanum, neodymium, samarium, europium, gadolinium, dysprosium, holmium, erbium, thulium, lutetium, and ytterbium.

First superconducting layer 12 is formed, for example, by pulsed laser deposition (PLD). First superconducting layer 12 may be formed by metal organic deposition (MOD), metal organic chemical vapor deposition (MOCVD), or vacuum deposition.

First superconducting layer 12 has a first surface 12*a* and a second surface 12*b*. First surface 12*a* faces intermediate layer 11*b*. Second surface 12*b* is a surface opposite to first surface 12*a*. The arithmetic average roughness (Ra) on second surface 12*b* is 20 nm or more. The arithmetic average roughness on second surface 12*b* may be 25 nm or more, 30 nm or more, 40 nm or more, 60 nm or more, 70 nm or more, or 80 nm or more. The maximum height (Rz) of second surface 12*b* is 0.25 μm or more. The maximum height of second surface 12*b* may be 0.5 μm or more or may be 1.0 μm or more. The upper limit of the arithmetic average roughness on second surface 12*b* and the upper limit of the maximum height of second surface 12*b* are not particularly limited. The arithmetic average roughness on second surface 12*b* and the maximum height of second surface 12*b* each may be selected within a range in which first superconducting layer 12 is not exposed from first protective layer 13 and first stabilization layer 14. The arithmetic average roughness on second surface 12*b* and the maximum height of second surface 12*b* are, for example, equal to or less than the sum of the thickness of first protective layer 13 and the thickness of first stabilization layer 14. Although the maximum height may also be referred to as a maximum height roughness, the designation of a "maximum height" is used throughout this specification.

The arithmetic average roughness on second surface 12*b* and the maximum height of second surface 12*b* are measured using a laser microscope VK-X3050 manufactured by KEYENCE CORPORATION. The measurement conditions for the arithmetic average roughness on second surface 12*b* and the maximum height of second surface 12*b* are determined based on JIS B 0601:2013. Before measuring the arithmetic average roughness on second surface 12*b* and the maximum height of second surface 12*b*, first protective layer 13 and first stabilization layer 14 are removed with an aqueous solution obtained by mixing a hydrogen peroxide solution and an ammonia solution at a ratio of 1:1. This removal of first protective layer 13 and first stabilization layer 14 with the aqueous solution does not influence the surface properties of second surface 12*b*.

The positions in a measurement region in the longitudinal direction of first superconducting wire 10 at which the arithmetic average roughness and the maximum height are measured are arbitrarily selected. This measurement region has a width of 100 mm in the longitudinal direction of first superconducting wire 10. From this measurement region, two cross-sectional curves are obtained. In the width direction of first superconducting wire 10, the center of the measurement region is located at the center of first superconducting wire 10, and the width of the measurement region is 50 percent of the width of first superconducting wire 10. The average value of the arithmetic average roughnesses obtained from the two cross-sectional curves is defined as an arithmetic average roughness on second surface 12*b*, and the average value of the maximum heights obtained from the two cross-sectional curves is defined as a maximum height of second surface 12*b*. The two cross-sectional curves are apart from each other by 5 percent or more of the width of first superconducting wire 10 in the width direction of first superconducting wire 10. When the arithmetic average roughness and the maximum height of second surface 12*b* are measured after connection to second superconducting wire 20, the above-mentioned measurement region is located at a position whose distance from connection layer 30 in the longitudinal direction of first superconducting wire 10 is 100 mm or less.

In the entire second surface 12*b*, the arithmetic average roughness and the maximum height need not be 20 nm or more and 0.25 μm or more, respectively. Second surface 12*b* should only have a portion having an arithmetic average roughness of 20 nm or more and a maximum height of 0.25 μm or more. More specifically, the arithmetic average roughness on second surface 12*b* and the maximum height of second surface 12*b* should only be 20 nm or more and 0.25 μm or more, respectively, at a position where second surface 12*b* overlaps with connection layer 30 and in the vicinity of this position. The vicinity of the position where second surface 12*b* overlaps with connection layer 30 is a region whose distance from connection layer 30 in the longitudinal direction of first superconducting wire 10 is 100 mm or less.

When the arithmetic average roughness on second surface 12*b* is 60 nm or more, the maximum height of second surface 12*b* may be less than 0.25 μm.

The thickness of first superconducting layer 12 is defined as a thickness T1. Thickness T1 is preferably 4.5 μm or less.

In the copper layer of base material 11*a*, crystal grains are oriented. Thus, the crystal grains are oriented also in the nickel layer of base material 11*a* and intermediate layer 11*b*. As a result, the crystal grains in the REBCO in first superconducting layer 12 are biaxially oriented. In other words, an a-axis and a c-axis of the REBCO in first superconducting layer 12 respectively extend in the direction orthogonal to the normal to second surface 12*b* and in the direction of the normal to second surface 12*b*.

First substrate 11 is not limited to the above-mentioned example. Base material 11*a* may be a tape made of Hastelloy (registered trademark), and intermediate layer 11*b* may be formed on this tape by ion beam assisted deposition (IBAD).

Note that the arithmetic average roughness and the maximum height of second surface 12*b* can be adjusted by appropriately changing the type of first substrate 11, thickness T1, the film forming method for first superconducting layer 12, the film forming temperature for first superconducting layer 12, and the like. For example, forming first superconducting layer 12 by MOD results in a smaller arithmetic average roughness and a smaller maximum height of second surface 12*b*. The arithmetic average roughness and the maximum height of second surface 12*b* can be partially changed by changing the above-mentioned conditions in the longitudinal direction of first superconducting wire 10. More specifically, the arithmetic average roughness and the maximum height of second surface 12*b* can be partially changed only in the portion that is provided for connection to second superconducting wire 20 by connection layer 30. When the arithmetic average roughness and the maximum height of second surface 12*b* are substantially uniform in the longitudinal direction of first superconducting wire 10, the manufacturing conditions can be easily controlled, and thus, the cost of manufacturing first superconducting wire 10 can be reduced.

The constituent material of first protective layer 13 contains, for example, silver (Ag). The constituent material of first protective layer 13 may contain copper. The main material of the constituent material of first protective layer 13 may be silver or copper. The main material means a material that occupies 50% by mass or more of the constituent material. First protective layer 13 is formed, for example, by sputtering. First protective layer 13 is disposed on first superconducting layer 12. The thickness of first protective layer 13 is defined as a thickness T2. When the constituent material of first protective layer 13 is silver, thickness T2 may be 1.0 μm or more, or may be less than 1.0 μm.

The constituent material of first stabilization layer 14 contains, for example, copper. The constituent material of first stabilization layer 14 may be a copper alloy. The main material of the constituent material of first stabilization layer 14 may be copper. First stabilization layer 14 is disposed on first protective layer 13. First stabilization layer 14 is formed, for example, by plating.

Second superconducting wire 20 includes a second substrate 21, a second superconducting layer 22, a second protective layer 23, and a second stabilization layer 24.

Second substrate 21 includes a base material 21*a* and an intermediate layer 21*b*. Intermediate layer 21*b* is disposed on base material 21*a*. Base material 21*a* is, for example, a cladding material in which a copper layer and a nickel layer are stacked on a stainless steel tape. Intermediate layer 21*b* is, for example, a layer in which a layer of cerium oxide, a layer of yttria-stabilized zirconia, and a layer of yttria are stacked. Intermediate layer 21*b* is formed, for example, by magnetron sputtering.

Second superconducting layer 22 is disposed on second substrate 21. More specifically, second superconducting layer 22 is disposed on intermediate layer 21*b*. The constituent material of second superconducting layer 22 is, for example, REBCO. The rare earth element in the REBCO constituting second superconducting layer 22 is at least one or more elements selected from the group consisting of yttrium, lanthanum, neodymium, samarium, europium, gadolinium, dysprosium, holmium, erbium, thulium, lutetium, and ytterbium.

Second superconducting layer 22 is formed, for example, by PLD. Second superconducting layer 22 may be formed by MOD, MOCVD, or vacuum deposition.

Second superconducting layer 22 has a third surface 22*a* and a fourth surface 22*b*. Third surface 22*a* faces intermediate layer 21*b*. Fourth surface 22*b* is a surface opposite to third surface 22*a*. The arithmetic average roughness on fourth surface 22*b* is 20 nm or more. The arithmetic average roughness on fourth surface 22*b* may be 25 nm or more, 30 nm or more, 40 nm or more, 60 nm or more, 70 nm or more, or 80 nm or more.

The maximum height of fourth surface 22*b* is 0.25 μm or more. The maximum height of fourth surface 22*b* may be 0.5 μm or more or may be 1.0 μm or more. The upper limit of the arithmetic average roughness on fourth surface 22*b* and the upper limit of the maximum height of fourth surface 22*b* are not particularly limited. The arithmetic average roughness on fourth surface 22*b* and the maximum height of fourth surface 22*b* each may be selected within a range in which second superconducting layer 22 is not exposed from second protective layer 23 and second stabilization layer 24. The arithmetic average roughness on fourth surface 22*b* and the maximum height of fourth surface 22*b* are, for example, equal to or less than the sum of the thickness of second protective layer 23 and the thickness of second stabilization layer 24. Note that the arithmetic average roughness on fourth surface 22*b* and the maximum height of fourth surface 22*b* are respectively measured by the same methods as those for the arithmetic average roughness on second surface 12*b* and the maximum height of second surface 12*b*.

In the entire fourth surface 22*b*, the arithmetic average roughness and the maximum height need not be 20 nm or more and 0.25 μm or more, respectively. Fourth surface 22*b* should only have a portion having an arithmetic average roughness of 20 nm or more and a maximum height of 0.25 μm or more. More specifically, the arithmetic average roughness and the maximum height of fourth surface 22*b* should only be 20 nm or more and 0.25 μm or more, respectively, at a position where fourth surface 22*b* overlaps with connection layer 30.

When the arithmetic average roughness on fourth surface 22*b* is 60 nm or more, the maximum height of fourth surface 22*b* may be less than 0.25 μm.

The thickness of second superconducting layer 22 is defined as a thickness T3. Thickness T3 is preferably 4.5 μm or less.

In the copper layer of base material 21*a*, crystal grains are oriented. Thus, the crystal grains are oriented also in the nickel layer of base material 21*a* and intermediate layer 21*b*. As a result, the crystal grains in the REBCO of second superconducting layer 22 are biaxially oriented. In other words, an a-axis and a c-axis of the REBCO in second superconducting layer 22 respectively extend in the direction orthogonal to the normal to fourth surface 22*b* and in the direction of the normal to fourth surface 22*b*.

Second substrate 21 is not limited to the above-mentioned example. Base material 21*a* may be a tape made of Hastelloy (registered trademark), and intermediate layer 21*b* may be formed on this tape by IBAD.

Note that the arithmetic average roughness and the maximum height of fourth surface 22*b* can be adjusted by appropriately changing the type of second substrate 21, thickness T3, the film forming method for second superconducting layer 22, the film forming temperature for second superconducting layer 22, and the like. For example, forming second superconducting layer 22 by MOD results in a smaller arithmetic average roughness and a smaller maximum height of fourth surface 22*b*. The arithmetic average roughness and the maximum height of fourth surface 22*b* can be partially changed by changing the above-mentioned conditions in the longitudinal direction of second superconducting wire 20. More specifically, the arithmetic average roughness and the maximum height of fourth surface 22*b* can be partially changed only in the portion that is provided for connection to first superconducting wire 10 by connection layer 30. When the arithmetic average roughness and the maximum height of fourth surface 22*b* are substantially uniform in the longitudinal direction of second superconducting wire 20, the manufacturing conditions can be easily controlled, and thus, the cost of manufacturing second superconducting wire 20 can be reduced.

The constituent material of second protective layer 23 contains, for example, silver. The constituent material of second protective layer 23 may contain copper. The main material of the constituent material of second protective layer 23 may be silver or copper. Second protective layer 23 is formed, for example, by sputtering. Second protective layer 23 is disposed on second superconducting layer 22. The thickness of second protective layer 23 is defined as a thickness T4. When second protective layer 23 is made of silver, thickness T4 may be 1.0 μm or more, or may be less than 1.0 μm.

The constituent material of second stabilization layer 24 contains, for example, copper. The constituent material of second stabilization layer 24 may be a copper alloy. The main material of the constituent material of second stabilization layer 24 may be copper. Second stabilization layer 24 is disposed on second protective layer 23. Second stabilization layer 24 is formed, for example, by plating.

Figure 2:
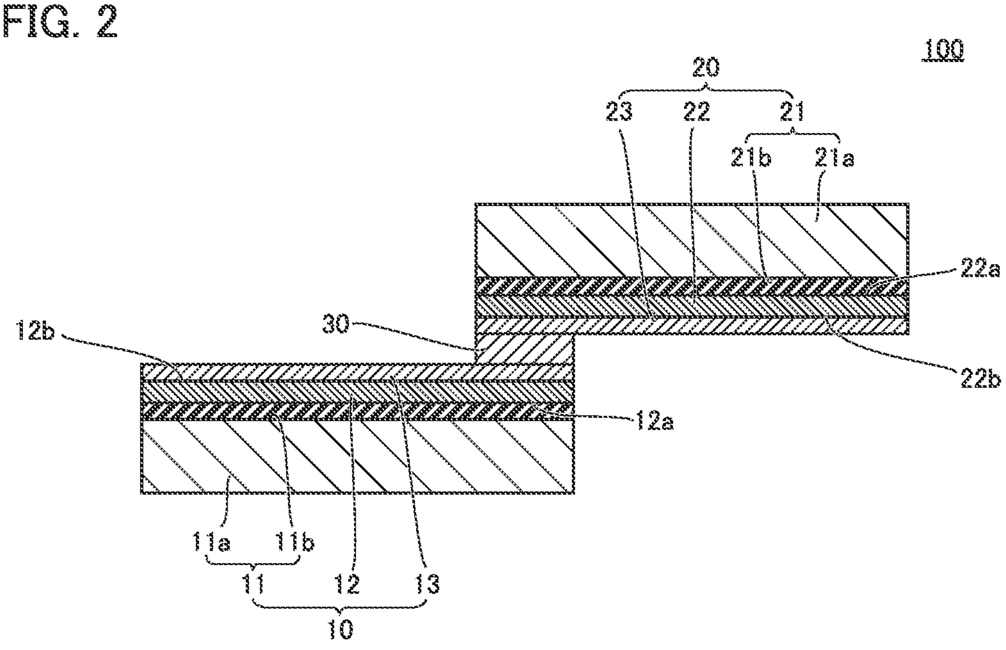
FIG. 2 is a cross-sectional view of a superconducting wire connection structure 100 according to a modification.

FIG. 2 is a cross-sectional view of a superconducting wire connection structure 100 according to a modification. As shown in FIG. 2, first superconducting wire 10 may not include first stabilization layer 14, and second superconducting wire 20 may not include second stabilization layer 24. In other words, first protective layer 13 may be an outermost layer in first superconducting wire 10, and second protective layer 23 may be an outermost layer in second superconducting wire 20. In this case, thicknesses T2 and T4 each are preferably 1.0 μm or more.

As shown in FIG. 1, first superconducting wire 10 is disposed to at least partially overlap with second superconducting wire 20. First stabilization layer 14 at least partially faces second stabilization layer 24. More specifically, first stabilization layer 14 at the longitudinal end of first superconducting wire 10 faces second stabilization layer 24 at the longitudinal end of second superconducting wire 20.

Connection layer 30 is, for example, a solder alloy such as a tin (Sn) alloy. Connection layer 30 is disposed between first stabilization layer 14 and second stabilization layer 24 facing each other to thereby connect first stabilization layer 14 and second stabilization layer 24. Thus, first superconducting layer 12 and second superconducting layer 22 are connected in a normal conducting state.

As shown in FIG. 2, when first superconducting wire 10 does not have first stabilization layer 14 and second superconducting wire 20 does not have second stabilization layer 24, connection layer 30 is disposed between first protective layer 13 and second protective layer 23 facing each other to thereby connect first protective layer 13 and second protective layer 23.

The connection resistivity between first superconducting wire 10 and second superconducting wire 20 is preferably 200 $n\Omega \cdot cm^2$ or less. Note that the connection resistivity between first superconducting wire 10 and second superconducting wire 20 is a value obtained by multiplying the connection resistivity between first superconducting wire 10 and second superconducting wire 20 by the area of connection between first superconducting wire 10 and second superconducting wire 20. Three samples are prepared, each of which is obtained by connecting first superconducting wire 10 and second superconducting wire 20 by connection layer 30, and also, the average value of the connection resistivities measured for the respective samples is defined as a connection resistivity between first superconducting wire 10 and second superconducting wire 20. The connection resistivity between first superconducting wire 10 and second superconducting wire 20 is measured by a four-terminal method.

Figure 3:
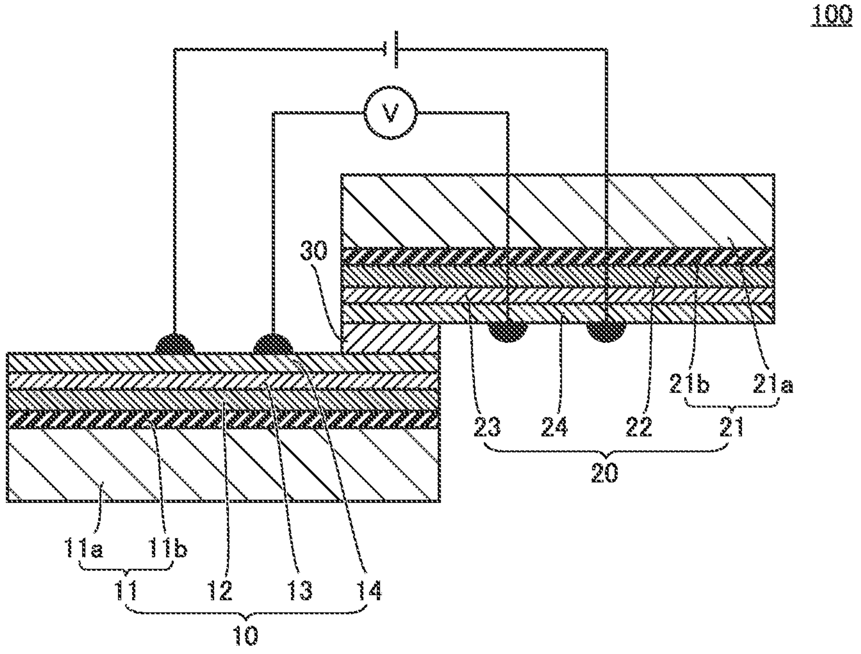
FIG. 3 is a schematic cross-sectional view for illustrating a method of measuring a connection resistivity between a first superconducting wire 10 and a second superconducting wire 20.
Figure 4:
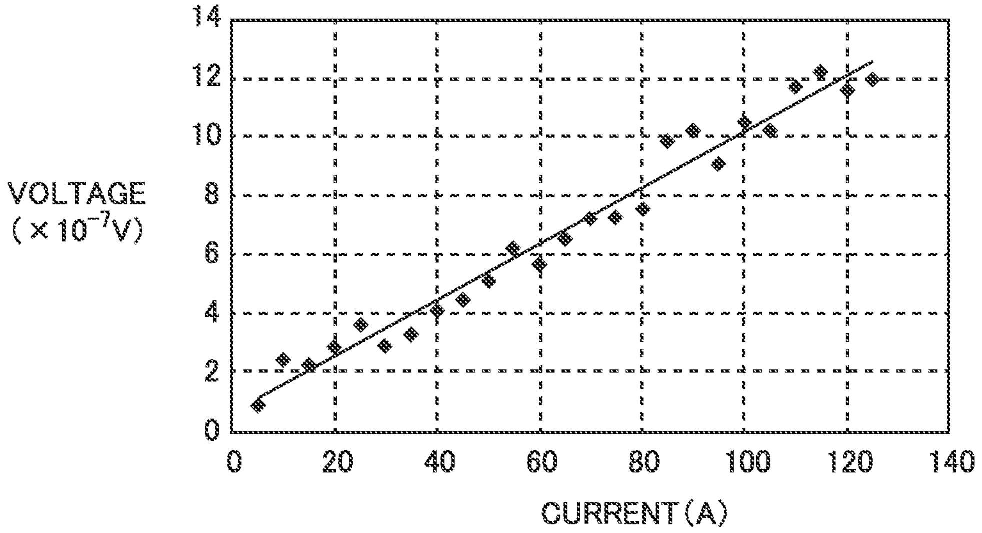
FIG. 4 is an exemplary plot showing current-voltage characteristics of superconducting wire connection structure 100 that are obtained by a four-terminal method.

FIG. 3 is a schematic cross-sectional view for illustrating a method of measuring a connection resistivity between first superconducting wire 10 and second superconducting wire 20. FIG. 4 is an exemplary plot showing current-voltage characteristics of superconducting wire connection structure 100 that are obtained by a four-terminal method. As shown in FIG. 3, when measuring the connection resistivity between first superconducting wire 10 and second superconducting wire 20, firstly, a first terminal and a second terminal connected to a power supply are connected to first stabilization layer 14 and second stabilization layer 24, respectively. Secondly, a third terminal and a fourth terminal connected to a voltmeter are connected to first stabilization layer 14 and second stabilization layer 24, respectively. The position at which the third terminal is connected is closer to the connection portion between first superconducting wire 10 and second superconducting wire 20 than the position at which the first terminal is connected, and the position at which the fourth terminal is connected is closer to the connection portion between first superconducting wire 10 and second superconducting wire 20 than the position at which the second terminal is connected. The above-mentioned voltmeter is, for example, 2182A NANOVOLTMETER manufactured by KEITHLEY.

Thirdly, in the state in which superconducting wire connection structure 100 is cooled to 77 Kelvin by liquid nitrogen, and while the power supply changes the current flowing between the first terminal and the second terminal, the voltmeter measures the voltage between the third terminal and the fourth terminal. This provides a plot of the current-voltage characteristics as shown in FIG. 4. The slope of the current-voltage characteristics is calculated based on the obtained plot of the current-voltage characteristics. This slope represents a connection resistivity between first superconducting wire 10 and second superconducting wire 20. Fourthly, by multiplying this connection resistivity by the area of connection between first superconducting wire 10 and second superconducting wire 20, the connection resistivity between first superconducting wire 10 and second superconducting wire 20 is obtained. The area of connection between first superconducting wire 10 and second superconducting wire 20 is an area in which first superconducting wire 10 and second superconducting wire 20 are connected by connection layer 30. When first superconducting wire 10 and second superconducting wire 20 have the same width and the first superconducting wire 10 and second superconducting wire 20 are connected by connection layer 30 in the entire width direction, the area of connection between the first superconducting wire and second superconducting wire 20 is the product of the width of first superconducting wire 10 (second superconducting wire 20) and the length of connection. The length of connection is the length of a portion of first superconducting wire 10 (second superconducting wire 20) along which it is connected by connection layer 30. When the width of one of first superconducting wire 10 and second superconducting wire 20 is smaller than the width of the other of first superconducting wire 10 and second superconducting wire 20, the area of connection is the product of the length of connection and the smaller one of the widths of first superconducting wire 10 and second superconducting wire 20. When first superconducting wire 10 and second superconducting wire 20 do not have first stabilization layer 14 and second stabilization layer 24, respectively, the first terminal and the third terminal are connected to first protective layer 13 while the second terminal and the fourth terminal are connected to second protective layer 23. The above-mentioned length of connection, which depends on the widths of first superconducting wire 10 and second superconducting wire 20, is, for example, 0.5 cm or more and 10 cm or less. Further, the width of each of first superconducting wire 10 and second superconducting wire 20 is, for example, 0.3 mm or more and 5 mm or less.

Effects of Superconducting Wire Connection Structure According to Embodiment

The effects of superconducting wire connection structure 100 will be described below.

The result of intensive studies by the present inventor shows that a smaller arithmetic average roughness and a smaller maximum height of each of second surface 12*b* and fourth surface 22*b* result in a higher connection resistivity between first superconducting wire 10 and second superconducting wire 20 in the state in which first superconducting wire 10 and second superconducting wire 20 are connected by connection layer 30.

In superconducting wire connection structure 100, the arithmetic average roughness on each of second surface 12*b* and fourth surface 22*b* is 20 nm or more, and the maximum height of each of second surface 12*b* and fourth surface 22*b* is 0.25 μm or more. Thus, according to superconducting wire connection structure 100, the connection resistivity between first superconducting wire 10 and second superconducting wire 20 can be lowered.

When first superconducting wire 10 and second superconducting wire 20 are connected with a solder alloy, the outermost layer of each of first superconducting wire 10 and second superconducting wire 20 dissolves in the molten solder alloy. When this dissolution progresses and the molten solder alloy reaches second surface 12*b* and fourth surface 22*b*, the connection between first superconducting wire 10 and second superconducting wire 20 may not be achieved.

When the constituent material of first stabilization layer 14 is copper or a copper alloy, the outermost layer of first superconducting wire 10 contains copper as a main component. When the constituent material of second stabilization layer 24 is copper or a copper alloy, the outermost layer of second superconducting wire 20 contains copper as a main component. Copper less easily dissolves in the molten solder alloy than silver.

Thus, in the case where the constituent material of each of first stabilization layer 14 and second stabilization layer 24 is copper or a copper alloy, occurrence of a connection failure resulting from the above-mentioned dissolution can be suppressed. In the case where the constituent material of each of first protective layer 13 and second protective layer 23 contains copper, the above-mentioned dissolution further less easily progresses.

When the constituent material of the outermost layer of each of first superconducting wire 10 and second superconducting wire 20 contains silver, i.e., when first superconducting wire 10 and second superconducting wire 20 do not have first stabilization layer 14 and second stabilization layer 24, respectively, and the constituent material of each of first protective layer 13 and second protective layer 23 contains silver, connection with a solder alloy is easily achieved. On the other hand, silver easily dissolves in the molten solder alloy, and accordingly, if thicknesses T2 and T4 are small, the molten solder alloy reaches the vicinity of each of first superconducting layer 12 and second superconducting layer 22. The molten solder alloy that reaches the vicinity of each of first superconducting layer 12 and second superconducting layer 22 reduces the adhesion of the solder alloy to first superconducting layer 12 and second superconducting layer 22, which may lead to a connection failure. Thicknesses T2 and T4 of 1 μm or more make it possible to suppress occurrence of a connection failure resulting from the above-mentioned dissolution.

When thicknesses T1 and T3 each are 4.5 μm or less, first superconducting wire 10 and second superconducting wire 20 can be reduced in thickness. In this case, the cost of manufacturing first superconducting wire 10 and second superconducting wire 20 can be reduced.

First Test

The following describes a first test.

In the first test, samples 1 to 19 were prepared each as a sample of the superconducting wire connection structure. In samples 1 to 19, the types of first substrate 11 and second substrate 21, the film forming method for first superconducting layer 12 and second superconducting layer 22, thicknesses T1 and T3, the arithmetic average roughness on each of second surface 12*b* and fourth surface 22*b*, the maximum height of each of second surface 12*b* and fourth surface 22*b*, and the length of connection were changed. The details of samples 1 to 19 are shown in Tables 1 and 2. In samples 1 to 19, the constituent material of each of first protective layer 13 and second protective layer 23 was silver, and the constituent material of each of first stabilization layer 14 and second stabilization layer 24 was copper. In samples 1 to 19, the width of each of first superconducting layer 12 and second superconducting layer 22 was 4 mm, and the value obtained by multiplying this width by each of the lengths of connection shown in Tables 1 and 2 was defined as an area of connection used for calculating the connection resistivity.

TABLE 1

| Sample | 1 | 2 | 3 | 4 | 5 | 6 | 7 | 8 | 9 |
|---|---|---|---|---|---|---|---|---|---|
| Types of First Substrate 11 and Second Substrate 21 | Oriented Metal | Oriented Metal | Oriented Metal | Oriented Metal | Oriented Metal | Oriented Metal | IBAD | IBAD | IBAD |
| Film Forming Method for First Superconducting Layer 12 and Second Superconducting Layer 22 | PLD | PLD | PLD | MOD | MOD | MOD | Vacuum Deposition | Vacuum Deposition | Vacuum Deposition |
| Thickness T1 and Thickness T3 (μm) | 4 | 4 | 4 | 4 | 4 | 4 | 3 | 3 | 3 |
| Ra of Second Surface 12b and Fourth Surface 22b (nm) | 160 | 160 | 160 | 80 | 50 | 80 | 90 | 70 | 90 |
| Rz of Second Surface 12b and Fourth Surface 22b (μm) | 3.2 | 8.9 | 3.9 | 1.2 | 1.2 | 0.90 | 1.1 | 1.0 | 1.1 |
| Length of Connection (cm) | 1 | 5 | 10 | 1 | 5 | 10 | 1 | 5 | 10 |
| Connection Resistivity (nΩ · $cm^2$) | 38 | 46 | 41 | 75 | 110 | 85 | 70 | 90 | 85 |

TABLE 2

| Sample | 10 | 11 | 12 | 13 | 14 | 15 | 16 | 17 | 18 | 19 |
|---|---|---|---|---|---|---|---|---|---|---|
| Types of First Substrate 11 and Second Substrate 21 | IBAD | IBAD | IBAD | IBAD | IBAD | IBAD | IBAD | IBAD | IBAD | IBAD |
| Film Forming Method for First Superconducting Layer 12 and Second Superconducting Layer 22 | PLD | PLD | PLD | Vacuum Deposition | Vacuum Deposition | PLD | MOD | MOD | MOD | MOD |
| Thickness T1 and Thickness T3 (μm) | 3 | 3 | 3 | 2 | 2 | 2 | 3 | 2 | 2 | 2 |
| Ra of Second Surface 12b and Fourth Surface 22b (nm) | 80 | 100 | 90 | 30 | 40 | 50 | 30 | 20 | 10 | 20 |
| Rz of Second Surface 12b and Fourth Surface 22b (μm) | 0.85 | 1.3 | 1.4 | 0.43 | 0.51 | 1.0 | 0.53 | 0.16 | 0.22 | 0.25 |
| Length of Connection (cm) | 1 | 5 | 10 | 1 | 5 | 10 | 5 | 1 | 5 | 10 |
| Connection Resistivity (nΩ · $cm^2$) | 80 | 70 | 75 | 170 | 140 | 120 | 160 | 210 | 250 | 190 |

The "oriented metal" in Tables 1 and 2 means that a cladding material formed by cladding a stainless steel tape with a copper layer and a nickel layer is used in base materials 11*a* and 21*a*. Further, "IBAD" in Tables 1 and 2 means that intermediate layers 11*b* and 21*b* are formed by IBAD.

A condition A is defined based on the premise that the arithmetic average roughness on each of second surface 12*b* and fourth surface 22*b* is 20 nm or more. A condition B is defined based on the premise that the maximum height of each of second surface 12*b* and fourth surface 22*b* is 0.25 μm or more. In samples 1 to 16 and 19, both conditions A and B were satisfied. In samples 17 and 18, at least one of conditions A and B was not satisfied.

In the first test, the connection resistivity between first superconducting wire 10 and second superconducting wire 20 in each of samples 1 to 19 was measured. In samples 1 to 16 and 19, the connection resistivity between first superconducting wire 10 and second superconducting wire 20 was 200 nΩ·cm$^2$ or less. In samples 17 and 18, the connection resistivity between first superconducting wire 10 and second superconducting wire 20 exceeded 200 nΩ·cm$^2$. The above-mentioned comparison empirically revealed that the connection resistivity between first superconducting wire 10 and second superconducting wire 20 is lowered by satisfying both conditions A and B.

Second Test

In the second test, samples 20 to 29 were prepared each as a sample of the superconducting wire connection structure. In samples 20 to 29, the types of first substrate 11 and second substrate 21, the film forming method for first superconducting layer 12 and second superconducting layer 22, thicknesses T1 and T3, thicknesses T2 and T4, the arithmetic average roughness on each of second surface 12*b* and fourth surface 22*b*, the maximum height of each of second surface 12*b* and fourth surface 22*b*, and the length of connection were changed. The details of samples 20 to 29 are shown in Table 3. Although not shown in Table 3, sample 30 was prepared as a comparative example. In the comparative example, each of thicknesses T2 and T4 was 0.5 μm. In samples 20 to 29, the width of each of first superconducting layer 12 and second superconducting layer 22 was 4 mm, and the value obtained by multiplying this width by each of the lengths of connection shown in Table 3 was defined as an area of connection used for calculating the connection resistivity.

In samples 20 to 30, first superconducting wire 10 does not have first stabilization layer 14, and second superconducting wire 20 does not have second stabilization layer 24. In samples 20 to 30, first protective layer 13 and second protective layer 23 each was made of silver. In other words, samples 20 to 30 each have the structure shown in FIG. 2.

TABLE 3

| Sample | 20 | 21 | 22 | 23 | 24 | 25 | 26 | 27 | 28 | 29 |
|---|---|---|---|---|---|---|---|---|---|---|
| Types of First Substrate 11 and Second Substrate 21 | Oriented Metal | Oriented Metal | Oriented Metal | Oriented Metal | Oriented Metal | Oriented Metal | Oriented Metal | Oriented Metal | IBAD | IBAD |
| Film Forming Method for First Superconducting Layer 12 and Second Superconducting Layer 22 | PLD | PLD | PLD | PLD | PLD | MOD | MOD | MOD | MOD | MOD |
| Thickness T1 and Thickness T3 (μm) | 4 | 4 | 4 | 4 | 4 | 4 | 4 | 3 | 3 | 2 |
| Thickness T2 and Thickness T4 (μm) | 2 | 2 | 1 | 1 | 1 | 1 | 1 | 1 | 1 | 1 |
| Ra of Second Surface 12b and Fourth Surface 22b (nm) | 160 | 160 | 160 | 160 | 160 | 80 | 50 | 40 | 30 | 10 |
| Rz of Second Surface 12b and Fourth Surface 22b (μm) | 3.0 | 7.1 | 3.2 | 8.9 | 3.9 | 1.2 | 1.2 | 0.90 | 1.1 | 1.1 |
| Length of Connection (cm) | 1 | 10 | 1 | 5 | 10 | 1 | 5 | 10 | 1 | 10 |
| Connection Resistivity (nΩ · cm$^2$) | 38 | 46 | 80 | 70 | 70 | 130 | 160 | 180 | 200 | 350 |

In samples 20 to 28, both conditions A and B were satisfied, and additionally, thicknesses T2 and T4 each was 1.0 μm or more. Further, in samples 20 to 28, the connection resistivity between first superconducting wire 10 and second superconducting wire 20 was 200 nΩ·cm$^2$ or less.

In sample 29, one of conditions A and B was not satisfied. In sample 29, the connection between first superconducting wire 10 and second superconducting wire 20 was achieved, but the connection resistivity between first superconducting wire 10 and second superconducting wire 20 exceeded 200 nΩ·cm$^2$. In sample 30, the connection between first superconducting wire 10 and second superconducting wire 20 was not achieved.

The above-mentioned comparison empirically revealed that, even when silver is contained in the constituent material of first protective layer 13 as an outermost layer of first superconducting wire 10 and the constituent material of second protective layer 23 as an outermost layer of second superconducting wire 20, thicknesses T2 and T4 of 1.0 μm or more make it possible to suppress occurrence of a connection failure resulting from dissolution of first protective layer 13 and second protective layer 23.

Samples 1, 2, 3, 4, and 5 are the same as samples 22, 23, 24, 25, and 26, respectively, in terms of the types of first substrate 11 and second substrate 21, the film forming method for first superconducting layer 12 and second superconducting layer 22, the arithmetic average roughness on each of second surface 12*b* and fourth surface 22*b*, and the maximum height of each of second surface 12*b* and fourth surface 22*b*.

Samples 1, 2, 3, 4, and 5 are different from samples 22, 23, 24, 25, and 26, respectively, in that the outermost layer of first superconducting wire 10 is first stabilization layer 14 and the outermost layer of second superconducting wire 20 is second stabilization layer 24, i.e., copper is contained in the constituent material of the outermost layer of each of first superconducting wire 10 and second superconducting wire 20.

Samples 1, 2, 3, 4, and 5 are lower in connection resistivity between first superconducting wire 10 and second superconducting wire 20 than samples 22, 23, 24, 25, and 26, respectively.

The above-mentioned comparison empirically revealed that, when copper is contained in the constituent material of the outermost layer of each of first superconducting wire 10 and second superconducting wire 20, the connectivity between first superconducting wire 10 and second superconducting wire 20 is improved, and thus, the connection resistivity between first superconducting wire 10 and second superconducting wire 20 is lowered.

Third Test

The following describes a third test.

In the third test, samples 31 and 32 were prepared each as a sample of the superconducting wire connection structure. In samples 31 and 32, the arithmetic average roughness on each of second surface 12*b* and fourth surface 22*b*, the maximum height of each of second surface 12*b* and fourth surface 22*b*, and the length of connection were changed. In samples 31 and 32, thicknesses T1 and T2 each were 3 μm, intermediate layers 11*b* and 21*b* were formed by IBAD, and first superconducting layer 12 and second superconducting layer 22 were formed by MOD.

The details of samples 31 and 32 are shown in Table 4. In samples 31 and 32, the constituent material of each of first protective layer 13 and second protective layer 23 was silver, and the constituent material of each of first stabilization layer 14 and second stabilization layer 24 was copper. In samples 31 and 32, the width of each of first superconducting layer 12 and second superconducting layer 22 was 4 mm, and the value obtained by multiplying this width by each of the lengths of connection shown in Table 4 was defined as an area of connection used for calculating the connection resistivity.

TABLE 4

| Sample | 31 | 32 |
|---|---|---|
| Types of First Substrate 11 and Second Substrate 21 | IBAD | IBAD |
| Film Forming Method for First Superconducting Layer 12 and Second Superconducting Layer 22 | MOD | MOD |
| Thickness T1 and Thickness T3 (μm) | 3 | 3 |
| Ra of Second Surface 12b and Fourth Surface 22b (nm) | 80 | 60 |
| Rz of Second Surface 12b and Fourth Surface 22b (μm) | 0.24 | 0.23 |
| Length of Connection (cm) | 1 | 10 |
| Connection Resistivity (nΩ · cm$^2$) | 90 | 100 |

In samples 31 and 32, the arithmetic average roughness on each of second surface 12*b* and fourth surface 22*b* was 60 nm or more, whereas the maximum height of each of second surface 12*b* and fourth surface 22*b* was less than 0.25 μm. The connection resistivity of each of samples 31 and 32 was 200 nΩ·cm$^2$ or less. The above-mentioned comparison empirically revealed that, in the case where the arithmetic average roughness on each of second surface 12*b* and fourth surface 22*b* is 60 nm or more, the connection resistivity between first superconducting wire 10 and second superconducting wire 20 is lowered even if the maximum height of each of second surface 12*b* and fourth surface 22*b* is less than 0.25 μm.

The above-described embodiments include the following aspects.

Supplementary Note 1

A superconducting wire includes a substrate and a superconducting layer disposed on the substrate. The superconducting layer has a first surface facing the substrate and a second surface opposite to the first surface. The second surface has a portion having an arithmetic average roughness of 60 nm or more.

Supplementary Note 2

A superconducting wire connection structure includes a first superconducting wire, a second superconducting wire, and a connection layer. The first superconducting wire includes a first substrate, a first superconducting layer disposed on the first substrate, and a first protective layer disposed on the first superconducting layer. The second superconducting wire includes a second substrate, a second superconducting layer disposed on the second substrate, and a second protective layer disposed on the second superconducting layer. The first superconducting layer has a first surface facing the first substrate and a second surface opposite to the first surface. The second superconducting layer has a third surface facing the second substrate and a fourth surface opposite to the third surface. The first protective layer is connected to the second protective layer by a connection layer. The second surface has a portion having an arithmetic average roughness of 20 nm or more and a maximum height of 0.25 μm or more. The fourth surface has a portion having an arithmetic average roughness of 20 nm or more and a maximum height of 0.25 μm or more.

Supplementary Note 3

In the superconducting wire connection structure described in Supplementary Note 2, the constituent material of each of the first protective layer and the second protective layer contains silver.

Supplementary Note 4

In the superconducting wire connection structure described in Supplementary Note 3, the first protective layer and the second protective layer each have a thickness of 1.0 μm or more.

It should be understood that the embodiments disclosed herein are illustrative and non-restrictive in every respect. The scope of the present invention is defined by the scope of the claims, rather than the embodiments described above, and is intended to include any modifications within the meaning and scope equivalent to the scope of the claims.

REFERENCE SIGNS LIST

10 first superconducting wire, 11 first substrate, 11*a* base material, 11*b* intermediate layer, 12 first superconducting layer, 12*a* first surface, 12*b* second surface, 13 first protective layer, 14 first stabilization layer, 20 second superconducting wire, 21 second substrate, 21*a* base material, 21*b* intermediate layer, 22 second superconducting layer, 22*a* third surface, 22*b* fourth surface, 23 second protective layer, 24 second stabilization layer, 30 connection layer, 100 superconducting wire connection structure, T1, T2, T3, T4 thickness.

The invention claimed is:

1. A superconducting wire comprising:

a substrate; and a superconducting layer disposed on the substrate, wherein the superconducting layer has a first surface facing the substrate and a second surface opposite to the first surface, the second surface has a portion having an arithmetic average roughness of 20 nm or more and a maximum height of 0.25 μm or more, and the maximum height of the portion of the second surface is measured by:

(a) obtaining a first cross-sectional curve and a second cross-sectional curve from a measurement region included in the portion of the second surface, each of the first cross-sectional curve and the second cross-sectional curve having a sampling length;

(b) obtaining a first maximum height, the first maximum height being a sum of the largest peak height and the largest valley depth obtained from the first cross-sectional curve within the sampling length;

(c) obtaining a second maximum height, the second maximum height being a sum of the largest peak height and the largest valley depth obtained from the second cross-sectional curve within the sampling length, and (d) averaging the first maximum height and the second maximum height.

2. The superconducting wire according to claim 1, wherein the portion has an arithmetic average roughness of 60 nm or more and a maximum height of 0.25 μm or more.

3. The superconducting wire according to claim 1, further comprising a protective layer disposed on the superconducting layer, wherein a constituent material of the protective layer contains copper.

4. The superconducting wire according to claim 1, further comprising a protective layer disposed on the superconducting layer, wherein a constituent material of the protective layer contains silver.

5. The superconducting wire according to claim 4, wherein the protective layer forms an outermost layer of the superconducting wire, and the protective layer has a thickness of 1.0 μm or more.

6. The superconducting wire according to claim 3, further comprising a stabilization layer disposed on the protective layer, wherein a constituent material of the stabilization layer is copper or a copper alloy.

7. The superconducting wire according to claim 1, wherein the superconducting layer has a thickness of 4.5 μm or less.

8. A superconducting wire connection structure comprising:

a first superconducting wire;

a second superconducting wire; and a connection layer, wherein the first superconducting wire includes a first substrate, a first superconducting layer disposed on the first substrate, a first protective layer disposed on the first superconducting layer, and a first stabilization layer disposed on the first protective layer, the second superconducting wire includes a second substrate, a second superconducting layer disposed on the second substrate, a second protective layer disposed on the second superconducting layer, and a second stabilization layer disposed on the second protective layer, the first superconducting layer has a first surface facing the first substrate and a second surface opposite to the first surface, the second superconducting layer has a third surface facing the second substrate and a fourth surface opposite to the third surface, the first stabilization layer is connected to the second stabilization layer by the connection layer, the second surface has a portion having an arithmetic average roughness of 20 nm or more and a maximum height of 0.25 μm or more, the fourth surface has a portion having an arithmetic average roughness of 20 nm or more and a maximum height of 0.25 μm or more, and the maximum height of the portion of the second surface is measured by:

(a) obtaining a first cross-sectional curve and a second cross-sectional curve from a measurement region included in the portion of the second surface, each of the first cross-sectional curve and the second cross-sectional curve having a sampling length;

(b) obtaining a first maximum height of the portion of the second surface, the first maximum height of the portion of the second surface being a sum of a largest peak height and a largest valley depth obtained within the sampling length from the first cross-sectional curve from the measurement region included in the portion of the second surface;

(c) obtaining a second maximum height of the portion of the second surface, the second maximum height of the portion of the second surface being a sum of a largest peak height and a largest valley depth obtained within the sampling length from the second cross-sectional curve from the measurement region included in the portion of the second surface, and (d) averaging the first maximum height of the portion of the second surface and the second maximum height of the portion of the second surface, and the maximum height of the portion of the fourth surface is measured by:

(a) obtaining a first cross-sectional curve and a second cross-sectional curve from a measurement region included in the portion of the fourth surface, each of the first cross-sectional curve and the second cross-sectional curve having a sampling length;

(b) obtaining a first maximum height of the portion of the fourth surface, the first maximum height of the portion of the fourth surface being a sum of a largest peak height and a largest valley depth obtained within the sampling length from the first cross-sectional curve from the measurement region included in the portion of the fourth surface;

(c) obtaining a second maximum height of the portion of the fourth surface, the second maximum height of the portion of the fourth surface being a sum of a largest peak height and a largest valley depth obtained within the sampling length from the second cross-sectional curve from the measurement region included in the portion of the fourth surface, and (d) averaging the first maximum height of the portion of the fourth surface and the second maximum height of the portion of the fourth surface.

* * * * *